United States Patent
Ekman

(10) Patent No.: US 7,447,814 B1
(45) Date of Patent: Nov. 4, 2008

(54) METHOD AND APPARATUS FOR FAST LOSS-LESS MEMORY DATA COMPRESSION WHEREIN DATA CORRESPONDS TO A CACHE LINE OF DATA IN CACHE

(75) Inventor: Magnus Ekman, Gothenburg (SE)

(73) Assignee: Sun Microsystems, Inc., Santa Clara, CA (US)

( * ) Notice: Subject to any disclaimer, the term of this patent is extended or adjusted under 35 U.S.C. 154(b) by 496 days.

(21) Appl. No.: 11/251,257

(22) Filed: Oct. 14, 2005

(51) Int. Cl.
*G06F 3/00* (2006.01)
*G06F 12/00* (2006.01)
*G06F 12/10* (2006.01)

(52) U.S. Cl. .............................. 710/68; 710/69; 710/70; 711/118; 711/170

(58) Field of Classification Search ............. 710/68–70; 711/118, 170
See application file for complete search history.

(56) References Cited

U.S. PATENT DOCUMENTS 6,795,897 B2 * 9/2004 Benveniste et al. .......... 711/118

OTHER PUBLICATIONS

"Adaptive Cache Compression for High-Performance Processor," by Alaa R Alameldeen and David A. Wood, pp. 1-12, Jun. 19-23, 2004, http://www.cs.wisc.edu/multifacet/papers/isca04_adaptive_compression.pdf.*

"Design and Performance of a Main Memory Hardware Data Compressor", Morten Kjelso, Mark Gooch, Simon Jones; Electronic Systems Design Group, Loughborough University, Proceedings of Euromicro-22 IEEE 1996□□.*

Publication: "A Block-sorting Lossless Data Compression Algorithm" by Michael Burrows and David Wheeler, published by the Digital Systems Research Center, May 10, 1994.

Publication: "Compressed Caching and Modem Virtual Memory Simulation", by S.F. Kaplan, University of Texas at Austin, Dec. 1999.

* cited by examiner

*Primary Examiner*—Tammara R Peyton
(74) *Attorney, Agent, or Firm*—Park, Vaughan & Fleming LLP

(57) ABSTRACT

A method and apparatus for compressing uncompressed data by applying a transform prior to the application of a data compression scheme. At decompression time, a transform can be applied after a data decompression scheme has been applied to compressed data.

20 Claims, 12 Drawing Sheets

METHOD AND APPARATUS FOR FAST LOSS-LESS MEMORY DATA COMPRESSION WHEREIN DATA CORRESPONDS TO A CACHE LINE OF DATA IN CACHE

BACKGROUND OF THE INVENTION

This invention relates to a method and apparatus for compressing and/or decompressing data in a memory of a computer system. In particular, this invention relates to a method and apparatus for compressing uncompressed data in a first level memory of a computer system for storage in a second level memory of the computer system, and/or for decompressing compressed data in a second level memory of a computer system for storage in a first level memory of the computer system It is known to use data compression schemes to compress data held in the memory of a computer system. These schemes increase the effective capacity of the memory.

Computer systems often employ a hierarchical arrangement of memory levels in which smaller capacity but faster memory is located closer to a processor, whereas larger capacity but slower memory is provided at lower, more distant levels. For example, one such arrangement includes three memory levels in order of decreasing distance from the processor: storage (e.g., a hard disk), main memory (e.g., RAM) and cache memory. Additional cache memory levels can also be included. For example, in a two-level cache arrangement, a so-called L1 cache can be provided in between a processor and an L2 cache. Such an arrangement would include four memory levels in total. Where the processor registers are considered as a level of memory, then there would be five memory levels in this example.

In a hierarchical memory, data compression can be used between two levels of memory, to increase the effective capacity of the memory level which is more distant from the processor.

Compression can be used between memory levels, for example between a cache and a main memory. When data is written to the memory level which is more distant from the processor (also known as the lower memory level), a data compression scheme can be applied such that the data is stored in the more distant memory element in compressed form. Conversely, when data is read from the lower memory level in compressed form, the data compression scheme can be applied (hereinafter referred to as the data decompression scheme, although it will be understood that the data decompression scheme is normally just the reverse application of the data compression scheme) to decompress the data for entry into a higher memory level, which is less distant from the processor.

Memory in computer systems is normally arranged in a plurality of words. For example, a cache can comprise a plurality of cache lines, or cache blocks. Each cache line, or cache block, can typically store one or more data words. In many memory protocols, data is retrieved and written into a cache memory on a block-by-block basis. Similar considerations apply to main memory and storage. When a data compression scheme is applied, it can be applied on a block-by-block and/or word-by-word basis.

An example of a data compression scheme which is used in this context is the Frequent Pattern Compression (FPC) scheme. An overview of this scheme is described in a paper entitled "Frequent Pattern Compression: A Significance-Based Compression Scheme for L2 Caches", by Alaa R. Alameldeen and David A. Wood, Technical Report 1500, Computer Sciences Dept., UW-Madison, April 2004. This paper is available at www.cs.wisc.edu/multifacet/papers/tr1500_frequent_pattern_compression.pdf. Some examples of the FPC scheme are described below.

FPC Scheme

Example 1

In this first example, the compression scheme is applied to a 32 bit word.

Hereinafter, where a value is represented in a given number base, the base is indicated after that value in parentheses. For example, the value "12" can be written in base 10 as 12(10), in binary as 1100(2) or in hexadecimal as c(12).

The 32 bit word, to which the FPC scheme is to be applied in this example, is 0000bcad(116).

The FPC scheme targets repetitive or null values in a data word, and rewrites the word using predetermined prefixes to indicate the form of compression which has been applied.

In this particular example, the FPC takes advantage of the fact that the leading zeros in 0000bcad(16) (there are 16 of these when the word is written out in full in binary) can be more succinctly represented.

According to the FPC, the word 0000bcad(16) is compressed to 001(2)bcad(16). The three bit binary number 001(2) is the prefix, which in this example indicates that there are leading zeros. Since it is implicitly known that the uncompressed word is 32 bits in length, it can be inferred that that there are 16 leading zeros. The remainder of the word (the "data") in this example is not compressed. Nevertheless, in this example, the FPC scheme reduces a 32 bit word to a 19 bit word (3 bit binary prefix and 16 bits of data).

FPC Scheme

Example 2

In this example, the 32 bit data word fefefefe(16) is compressed to 010(2)fe(16). Here, the 3 bit prefix 010(2) indicates a repeated value. The value in question is fe(16), which occupies 8 bits in base 2. Again, it is implicitly known that the uncompressed data word consists of 32 bits, and accordingly it can be inferred that there are four repetitions of the value fe(16) in the uncompressed data word. In this example, the FPC scheme has reduced a 32 bit word to an 11 bit word (3 bit binary prefix and 8 bits of data).

The FPC scheme employs eight different prefixes. For further information regarding these prefixes and the compression types which they represent, the reader is directed to the paper by Alameldeen and Wood referenced above.

The Burrow-Wheeler transform pre-processes data so that when a data compression scheme is applied, a higher compression efficiency can be achieved. This transform is described in a report entitled "A Block-Sorting Lossless Data Compression Algorithm" by Michael Burrows and David Wheeler, published by the Digital Systems Research Center, May 10, 1994.

A Ph.D. thesis entitled "Compressed Caching and Modem Virtual Memory Simulation" by S. F. Kaplan, University of Texas at Austin, December 1999, describes WK-compressors aimed at compressing the data such as that found in the memory of a computer system. However, these compressors have dependencies similar to LZ-based compression algorithms. The dependencies are of the form that the algorithm works in a serial manner where one block of data needs to be decoded before a second block of data can be decoded and so on. For LZ-based algorithms the size of these dependent units is one byte, while for WK-compressors they are of the size four bytes. These dependencies make the algorithms difficult to make fast.

While compression schemes such as the FPC scheme allow data to be compressed with a reasonable degree of efficiency, it is desirable to obtain further efficiencies in data compression.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

According to an aspect of the invention, there is provided a method of compressing uncompressed data. The uncompressed data includes a plurality of data words. The data words include a plurality of data groups $G_{jk}$, where k denotes the $k^{th}$ data group in the $j^{th}$ data word. The method includes applying a transform to produce a transformed plurality of data words. The transform is of the form $G_{jk} \rightarrow G_{kj}$. The method also includes applying a data compression scheme to each data word in the plurality of transformed data words.

This method can also be applied substantially in reverse, for decompressing data which has been compressed.

Thus, according to another aspect of the invention, there is provided a method of decompressing compressed data. The method includes applying a data decompression scheme to the compressed data to produce a plurality of decompressed data words. The decompressed data words include a plurality of data groups $G_{kj}$, where j denotes the $j^{th}$ data group in the $k^{th}$ decompressed data word. The method also includes applying a transform to produce a transformed plurality of data words. The transform is of the form $G_{kj} \rightarrow G_{jk}$.

The above described methods can be performed in conjunction with each other for compressing and decompressing data as required.

The methods described above can be used for compressing and decompressing data between different memory levels in a hierarchical memory in a computer system.

The methods described above can be used for compressing and decompressing data for data transfer between two locations.

The methods described above can be implemented by an apparatus.

The invention can also be implemented as a computer program product. The computer program product can, for example, be provided on a carrier medium.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE DRAWINGS

Embodiments of this invention will be described hereinafter, by way of example only, with reference to the accompanying drawings in which like reference signs relate to like elements, and in which.

Figure 1:
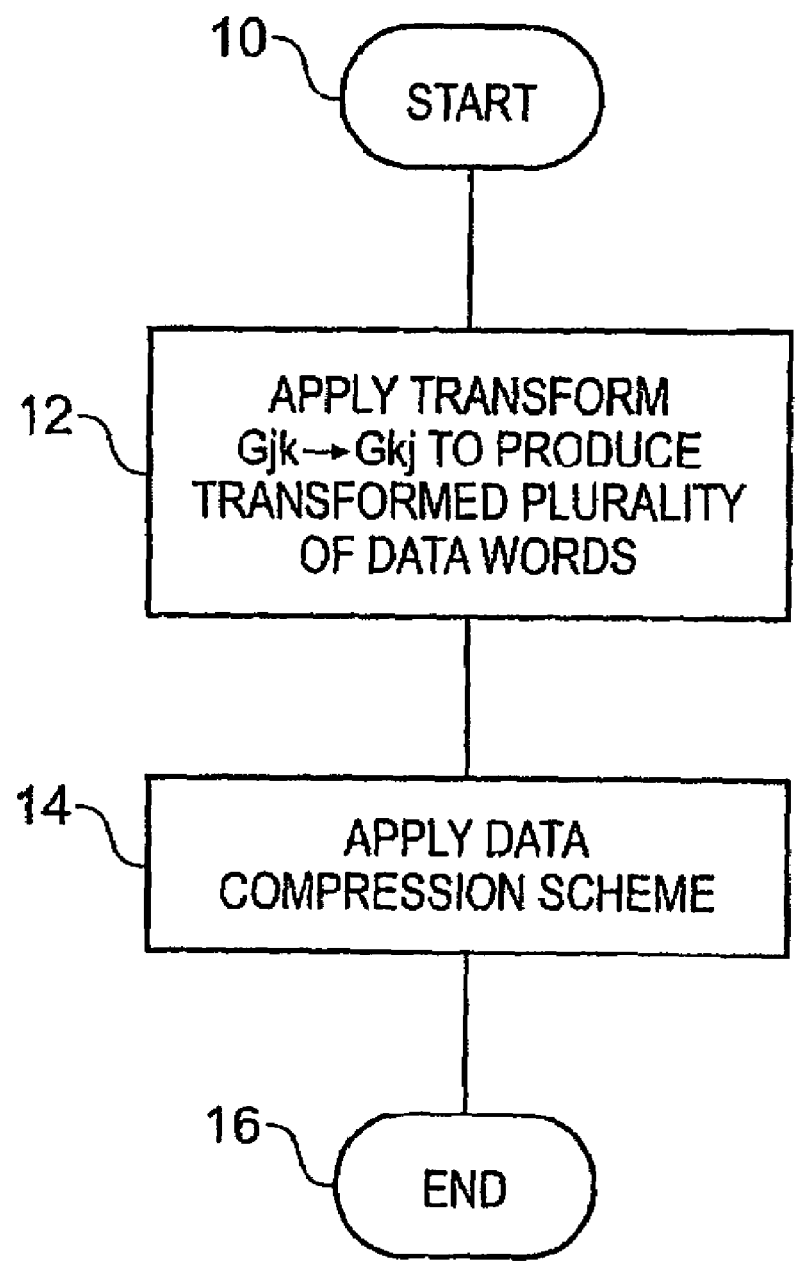
FIG. 1 illustrates a method of compressing uncompressed data in a first level memory of a computer system for storage in a second level memory of the computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims. In this regard, combinations of features from the independent claims with features of dependent claims other than as presented by the dependencies of the claims, and also with features from the description, are envisaged.

DESCRIPTION OF PARTICULAR EMBODIMENTS

Example embodiments of this invention are described in the following with reference to the accompanying drawings.

In an embodiment of the invention, data compression can be enhanced by applying a transform prior to the application of a data compression scheme. The aim of the transform is to rearrange the data into a form in which they are more readily compressible by the data compression scheme. In the following, the transform and an example of how the transform can be employed in combination with a data compression scheme, are described in general form and also by way of a more specific example. This is followed by a description of apparatus which can be employed in a computer system for implementing the invention.

Data to which a transform can be applied in accordance with embodiments of this invention is generally in the form of a plurality of data words each having a predetermined number of bits. Hereinafter, each data word is referred to as $G_j$, where j denotes the jth word, there being at least J data words in the data to be transformed and compressed.

Furthermore, each data word includes a plurality of data groups. Hereinafter, these data groups will be referred to as $G_{jk}$ where k denotes the kth data group in the jth data word, and where there are at least K data groups in each data word.

In one example, data is transformed and compressed in blocks comprising 16 bytes of data which are arranged into four data words. In this example, each data word comprises four bytes of data. In this example, each data word is split into four data groups, and each data group comprises one byte of data. Such an example is described below in relation to Tables 3 to 5. Before moving on to that specific example however, a general form of the transform and compression is described below in relation to Tables 1 and 2.

Table 1 illustrates a generalized data block. The data block includes J data words, each data word having K data groups. As is illustrated in Table 1, the data in a data block can be represented as an array of data groups $G_{jk}$.

TABLE 1

|  | 1st group | 2nd group | 3rd group | 4th group | 5th group | ... | Kth group |
|---|---|---|---|---|---|---|---|
| 1st word | $G_{11}$ | $G_{12}$ | $G_{13}$ | $G_{14}$ | $G_{15}$ | ... | $G_{1K}$ |
| 2nd word | $G_{21}$ | $G_{22}$ | $G_{23}$ | $G_{24}$ | $G_{25}$ | ... | $G_{2K}$ |
| 3rd word | $G_{31}$ | $G_{32}$ | $G_{33}$ | $G_{34}$ | $G_{35}$ | ... | $G_{3K}$ |
| 4th word | $G_{41}$ | $G_{42}$ | $G_{43}$ | $G_{44}$ | $G_{45}$ | ... | $G_{4K}$ |
| 5th word | $G_{51}$ | $G_{52}$ | $G_{53}$ | $G_{54}$ | $G_{55}$ | ... | $G_{5K}$ |
| ... | ... | ... | ... | ... | ... | ... | ... |
| Jth word | $G_{J1}$ | $G_{J2}$ | $G_{J3}$ | $G_{J4}$ | $G_{J5}$ | ... | $G_{JK}$ |

The first data word in the data block includes K data groups $G_{11}, G_{12}, G_{13}, G_{14}, G_{15}, \ldots G_{1K}$, while the second data word includes K data groups $G_{21}, G_{22}, G_{23}, G_{24}, G_{25}, \ldots G_{2K}$ and so on. The first data group in the data block is $G_{11}$, and the last data group in the data block is data group $G_{JK}$.

It is not necessary to physically arrange the data into an array. For example, the data may merely consist of a binary string of ones and zeros, which can be reordered in accordance with the transform described below. Nevertheless, arranging the data as shown in Table 1 allows the form of the transform to be more readily explained. Accordingly the array-like representation is used herein for illustrative purposes only.

A transform applied in embodiment of the invention is of the form $G_{jk} \rightarrow G_{kj}$. When a generalized data block of the type shown in Table 1 is transformed in this way, a set of transformed data words are produced, which are of the form shown in Table 2.

TABLE 2

|  | 1st group | 2nd group | 3rd group | 4th group | 5th group | ... | Jth group |
|---|---|---|---|---|---|---|---|
| 1st transformed word | $G_{11}$ | $G_{21}$ | $G_{31}$ | $G_{41}$ | $G_{51}$ | ... | $G_{J1}$ |
| 2nd transformed word | $G_{12}$ | $G_{22}$ | $G_{32}$ | $G_{42}$ | $G_{52}$ | ... | $G_{J2}$ |
| 3rd transformed word | $G_{13}$ | $G_{23}$ | $G_{33}$ | $G_{43}$ | $G_{53}$ | ... | $G_{J3}$ |
| 4th transformed word | $G_{14}$ | $G_{24}$ | $G_{34}$ | $G_{44}$ | $G_{54}$ | ... | $G_{J4}$ |
| 5th transformed word | $G_{15}$ | $G_{25}$ | $G_{35}$ | $G_{45}$ | $G_{55}$ | ... | $G_{J5}$ |
| ... | ... | ... | ... | ... | ... | ... | ... |
| Kth transformed word | $G_{1K}$ | $G_{2K}$ | $G_{3K}$ | $G_{4K}$ | $G_{5K}$ | ... | $G_{JK}$ |

It will be noted that in accordance with this transform, the columns in Table 1, which comprise the respective first data groups in each of the J data words, become the data groups in the first transformed data word. Similarly the second data groups in each respective data word of the untransformed data become the data groups of the second transformed data word, and so on and so forth. One way in which to view the transform is to envisage the data block as a matrix of elements comprising each data group. If the untransformed matrix is of the form $G=G_{jk}$, then the transform is of the form $G \rightarrow G^T$. Thus, the columns and rows of the matrix G are transposed. An example of the invention can be applied to non-square matrices as well as square matrices also. Accordingly, the data block may, for example, comprise only two data words, each data word comprising eight data groups. In such an example, the transformed data would comprise eight data words, each data word comprising two data groups. As will be described below, the number of words, the number of groups, and the sizes of the groups, the words and of the data block as a whole can be applied as parameters in an example of a transform of an embodiment of the invention.

A more specific example of the transform will now be described with reference to Tables 3 to 5, whereby benefits achievable by applying the transform will become more readily apparent.

TABLE 3

|  | 1st group | 2nd group | 3rd group | 4th group |
|---|---|---|---|---|
| 1st word | f3(16) | a5(16) | de(16) | 01(16) |
| 2nd word | f3(16) | a5(16) | de(16) | 03(16) |
| 3rd word | f3(16) | a5(16) | de(16) | 05(16) |
| 4th word | f3(16) | a5(16) | de(16) | 07(16) |

Table 3 shows a data block which comprises sixteen bytes of data: f3a5de01f3a5de03f3a5de05f3a5de17(16). The data can be arranged into four words: f3a5de01(16), f3a5de03(16), f3a5de05(16) and f3a5de07(16). As shown in Table 3, each data word can be split into four data groups. For example, the first data group of the second data word is f3(16), while the fourth data group of the fourth data word is 07(16). In this example, each data group of each data word comprises one byte of data.

The data shown in Table 3 may, for example, comprise data held in a cache memory. In particular, it is envisaged that the plurality of data words in a data block could correspond to a single cache line in the cache memory. A cache line may, for example, hold memory addresses. As described above, data held in computer memories such as cache memories often comprise repetitive or null values. In this example, the first second and third groups of the four data words the same hold the same values. As the data stands however, it is not readily compressible by a data compression scheme such as the FPC scheme described above.

In another example, the data shown in table 3 may comprise data to be transferred between two locations. After the compression, the data could be transferred on a transmission medium such as broadcast, telephonic, computer network, wired, wireless, electrical, electromagnetic, optical or indeed any other transmission medium. This increases the effective bandwidth of the transmission medium. Similarly, compressed data received via a transmission medium can be decompressed using the methods described herein.

By applying a transform as described herein however, the data in the data block shown in Table 3 can be transformed (rearranged) such that a data compression scheme such as, for example, FPC scheme can be applied. As described above in relation to tables 1 and 2, the transform is of the form $G_{jk} \rightarrow G_{kj}$. The transformed data are shown in Table 4.

TABLE 4

|  | 1st group | 2nd group | 3rd group | 4th group |
|---|---|---|---|---|
| 1st transformed word | f3(16) | f3(16) | f3(16) | f3(16) |
| 2nd transformed word | a5(16) | a5(16) | a5(16) | a5(16) |
| 3rd transformed word | de(16) | de(16) | de(16) | de(16) |
| 4th transformed word | 01(16) | 03(16) | 05(16) | 07(16) |

As can be seen from Table 4 the first transformed data word includes all of the data groups from the set of four first data groups in each of the four untransformed data words. Thus, the first transformed data word is f3f3f3f3(16). Similarly, the second and third transformed data words comprise the repeated data values from the second and third groups of each of the untransformed data words. Finally, the fourth transformed data word comprises non-repetitive data.

The transformed data words shown in Table 4 are now readily compressible by a variety of different compression schemes. In particular, the FPC data compression scheme is advantageously applicable following the transform $G_{jk} \rightarrow G_{kj}$.

Table 5 shows each transformed data word following the application of the FPC data compression scheme.

TABLE 5

| 1st compressed data word | 010(2)f3(16) |
| 2nd compressed data word | 010(2)a5(16) |
| 3rd compressed data word | 010(2)de(16) |
| 4th compressed data word | 111(2)01030507(16) |

In table 5, the 3-bit prefix of 4th "compressed" data word ("111(2)") is indicative that while a compression scheme such as the FPC scheme has been applied, no shortening of the 32 bit transformed data word resulted, and that the "compressed" data still comprise 32 bits. As indicated above, this is a consequence of the fact that the fourth transformed data word consisted of non-repetitive data.

As is apparent from Table 5, the application of the FPC data compression scheme produces compressed data words that are much smaller than could have been produced by the same compression scheme had the data words not first been transformed using the transform described herein. Thus, the original data block, which comprised 16 bytes (128 bits) of data has been compressed into a compressed data block, which comprises seven bytes of data (=56 bits), plus 9 bits comprised in compression prefixes for each of the first, second and third compressed data words, plus the three bit prefix of the fourth data word. This gives a total compressed data block length of 68 bits: less than half the length of the untransformed and uncompressed data block.

From Table 5 it is apparent that the fourth compressed data word is not in fact any shorter than the fourth transformed data word prior to the application of FPC scheme. Nevertheless, it is referred to herein as a compressed data word since the compression scheme has been applied to it, albeit that this did not result in any shortening of the word as such.

The transformed and compressed data block can be written as a data stream of the form 010(2)f3(16)010(2)a5(16)010(2)de(16)01030507(16).

A transform can be applied prior to the application of a data compression scheme for enhancing data compression, for example between levels of memory such as, for example between a cache and a main memory, or between an L1 cache and an L2 cache, an L2 cache and an L3 cache, or even between processor registers and the L1 cache. The method can also be applied for compressing data prior to transmission. An example of a method according to an embodiment of the invention is shown in FIG. 1.

The method starts at step 10 in FIG. 1. At step 12, the transform is applied to a block of data comprising data groups $G_{jk}$ as described above, to produce a transformed plurality of data words. The transform is of the form $G_{jk} \rightarrow G_{kj}$.

Next, at step 14, a data compression scheme is applied to the transformed plurality of data words. It should be stressed that the data compression scheme is not limited to the FPC scheme as described in the specific example shown above, but could comprise any data compression scheme which benefits from the compression of repetitive or null values.

The method can then end at step 16.

It will be understood that data which is transformed and compressed according to the examples given above can also be decompressed and then transformed using analogous methodology.

Figure 2:
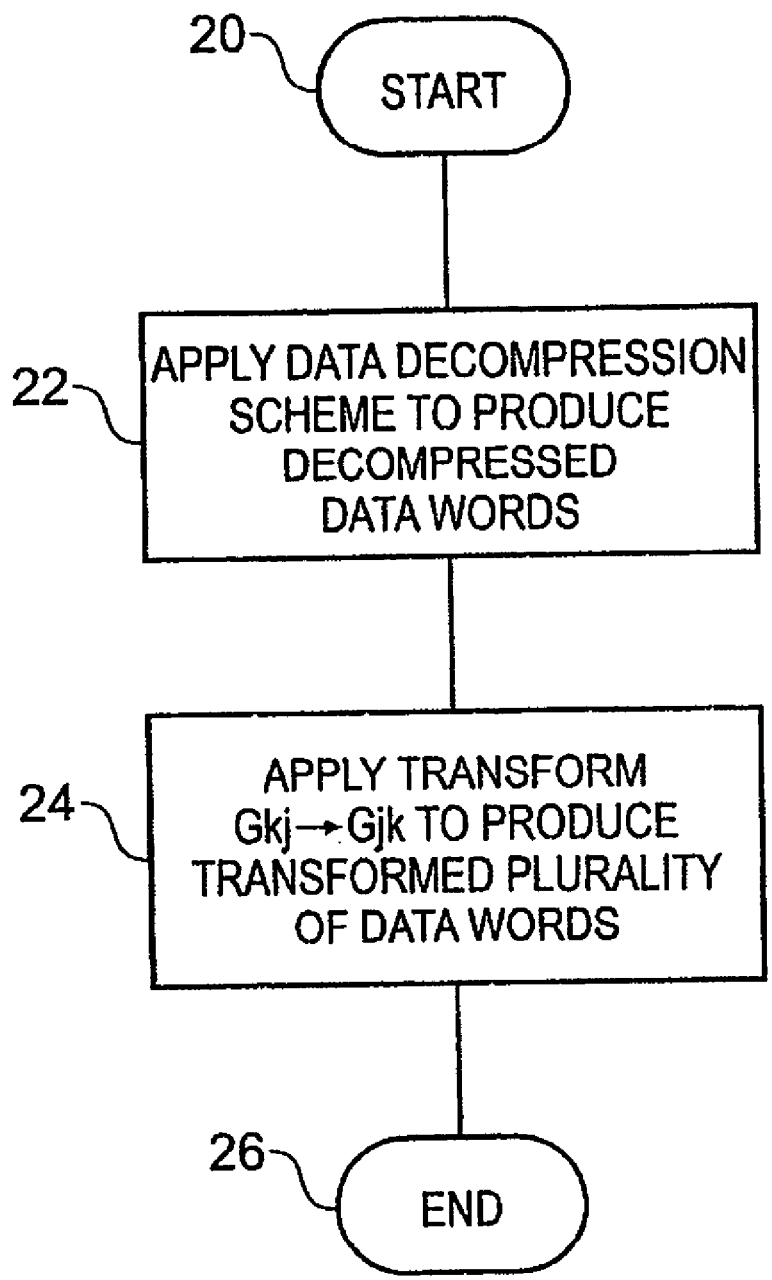
FIG. 2 illustrates a method of decompressing compressed data in a second level memory of a computer system for storage in a first level memory of the computer system.

Thus, FIG. 2 shows a method for decompressing data according to an embodiment of the invention.

The method starts at step 20.

At step 22, a data decompression scheme is applied to data which has already been compressed according to a method of the kind described above in relation to FIG. 1. Typically, the compressed data can comprise a plurality of compressed data words, and the application of the data decompression scheme to those compressed data words produces a plurality of decompressed data words. In a manner similar to the data arrangements described above, the decompressed data words comprise a plurality of data groups $G_{kj}$, where j notes the jth data group in the kth decompressed data word. These decompressed data words now correspond to transformed data words which were originally produced by applying the transform described above in relation to Tables 1 to 5 and FIG. 1.

The transform can now be applied to the decompressed data words, substantially in reverse, thereby to produce decompressed and untransformed data words corresponding to data words such as those shown in Tables 1 and 3. Accordingly, at step 24, a transform of the form $G_{kj} \rightarrow G_{jk}$ is applied, thereby to produce a transformed plurality of data words.

Thereafter the method can end at step 26.

In some embodiments, it is envisaged that data comprising a variable number of data words, having different numbers of data groups, and arranged in different data block sizes can be manipulated according to the transform and compression/decompression methodologies described herein. Indeed, as described above, these variables can themselves be applied as parameters in the transform and decompression methodology.

Thus, the number of bytes in a block of data to which the transform and compression scheme are applied may be varied as a parameter. Where the transform and compression scheme are applied on a block-by-block basis, the block size could, for example, be set at 4 bytes, 32 bytes, 512 bytes, 8 kB or 1 MB. Typically, the block size can be chosen to correspond to a block size which is used in the memory of a computer system. In one particular example, the block size can correspond to the page size in a memory of a computer system, while in another particular example the block size can correspond to a cache block size in the memory of the computer system.

For a given block size, there can be a given number of data words. For example, the data block can be split into 2, 4, 8, 64 or any other convenient number of data words.

Similarly, each data word can be split into any convenient number of groups, for example, 2 groups, 4 groups, 8 groups, 64 groups. Note that the number of data groups in each data word does not place any constraints on the number of data words in each data block. While in the example described above in relation to Tables 3 and 4, the data block includes the same number of data words as there are data groups in each data word, this need not necessarily be the case. As described above, the consequence of having, for example, more data groups in each data word than there are data words in each data block, is that when the data transform is applied to the uncompressed data, the resulting transformed data comprises more data words than there are data groups in each data word. Nevertheless, this need not inhibit or prevent the application of a data compression scheme such as FPC scheme to the transformed data words.

While the block size, word number and data group numbers can be tailored to correspond to the characteristics of a computer system, they could also be varied to maximize compression. For example, transforms and compression schemes can be applied using different block sizes, word numbers and data group numbers to select the transform and compression scheme which is best. This will be described in more detail below.

In some embodiments, it is envisaged that a tag can be added to the transformed and compressed data, thereby to indicate whether the data has been compressed, and/or to indicate characteristics of the transposition and compression scheme which have been applied. An example of this is now described in relation to Table 6.

The tag can be in the form of a binary prefix comprising a number of bits n, which indicates whether the data is compressed and the parameters for the transform and compression which has been used. In one example, a null tag value such as "00" can indicate that the data is uncompressed.

Where a compression scheme has been applied, and where the transform and compression type which has been applied is one of n transform and compression types, the tag can comprise $\log_2 n$ bits to identify which of the different transform and compression schemes has been applied. For example, where there are 8 different transform and compression schemes, $\log_2 8=3$ data bits are required uniquely to identify each respective transform and compression scheme.

It is envisaged that the parameters described above can be parameters which are characteristic of the particular transform and compression type which has been applied. The length of the data block is denoted hereinafter by the value B. The number of words in the data block is representable by the amount of data in each data word, given that the total amount of data in the data block is known. The amount of data in each data word is denoted herein after by W. The number of data groups in each data word can be represented by the amount of data in each data group, given that the amount of data in each data word is known. Thus, hereinafter, the amount of data in each data group is denoted by S. In the example shown in table 6, the values of B, W and S are given in bytes.

TABLE 6

| $T_1$ | $T_2$ | Transform type |
|---|---|---|
| 0 | 0 | No compression |
| 0 | 1 | W = 4 bytes; S = 1 byte; B = 8 bytes (⇒2 words) |
| 1 | 0 | W = 4 bytes; S = 1 bytes; B = 16 bytes (⇒4 words) |
| 1 | 1 | W = 8 bytes; S = 2 bytes; B = 32 bytes (⇒4 words) |

In Table 6, four different transform and compression types are available. In a computer system these different types of transform and compression can be predetermined in accordance with the operating parameters of a computer system such as the typical page size and cache block size in the computer system. Alternatively, the different types of transform and compression can be chosen as types likely to maximize compression.

There being four different transform and compression types, in this example, a two bit tag is required to identify each type. Note that the tag 00(2) indicates that the data are uncompressed. As shown in Table 6, the four types of transform and compression are applicable to block sizes of 8, 16 and 32 bytes. The third of these, which is identified by the tag 01(2), corresponds to a block size of 16 bytes, with four words and each word having four data groups each of length 1 byte. This corresponds to a transform and compression scheme as described above in relation to Tables 3 to 5. Accordingly, returning to that example, the transformed and compressed data can be supplemented with a tag to identify that particular transform and compression which has been applied:

01(2)010(2)f3(16)010(2)a5(16)010(2)de(16)01030507 (16).

When it comes to data decompression time, the tag can be used to identify how the transform and compression scheme was applied, thereby allowing correct parameters such as data block size, word size and data group size to be chosen for appropriate decompression and untransform.

In some examples, the tag can take the form of a variable sized code such as the Huffman encoding.

There will now be described a number of different examples of apparatus which can be used to implement this invention. As described above, this invention can be applied between different levels in a hierarchical memory in a computer system. For example, it can be used for compressing data which is held in a lower level of the hierarchical memory, and for decompression and entry into a higher level memory in a hierarchical memory when required. As described above, this allows the effective capacity of the lower level memory to be increased, although this does involve a reduction in speed due to computations required for application of the transform and compression schemes.

Figure 3:
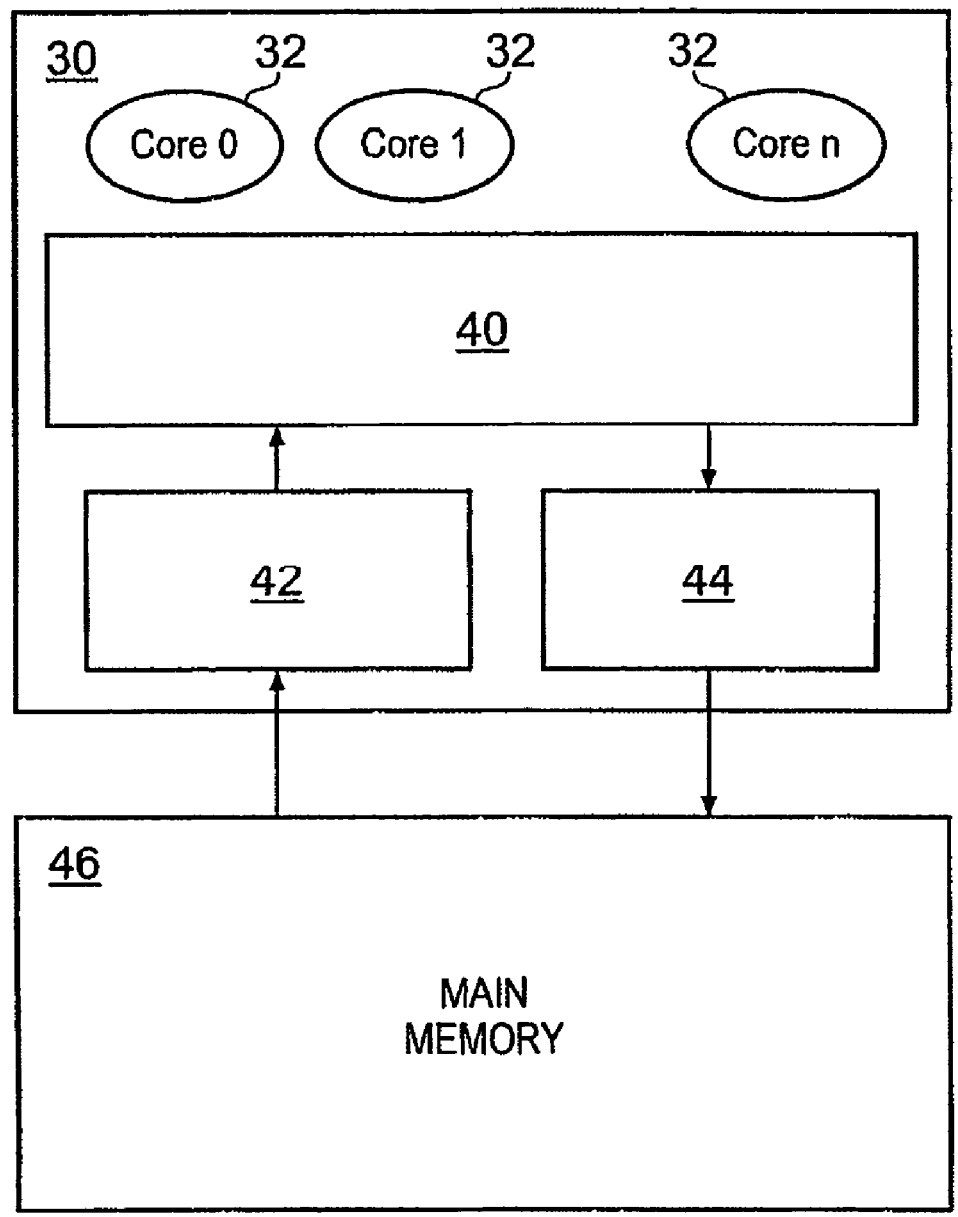
FIGS. 3 to 5 show example arrangements of a processor, a memory hierarchy and a number of transform and compression units and decompression and transform units in accordance with embodiments of the invention.

A first arrangement is shown in FIG. 3. FIG. 3 shows a processor chip 30, which comprises a number of processor cores 32, which are labeled core 0, core 1 . . . core n. In this example, a hierarchical memory is provided which comprises a main memory 46 and a number of on-chip caches labeled generally as 40. The main memory 46 is located away from the processor chip 30 and can, for example, comprise RAM such as dual in line memory modules (DIMMs). Thus, the hierarchical memory in this example comprises a first level memory (the on-chip caches 40) and a second level memory (the main memory 46). The first level memory is less distant from the processor cores 32 than is the second level memory. As described above, this arrangement is well known in the art of computer architecture, for producing a balance between speed and capacity in which lower capacity but faster memory types are located closer to processors than are larger capacity yet slower memory types. Embodiments of this invention allow data, which is stored in uncompressed form in a first level memory, such as the on-chip caches 40, to be compressed when it is written to a second level memory, such as the main memory 46, thereby to improve the effective capacity of the second level memory.

Figure 4:
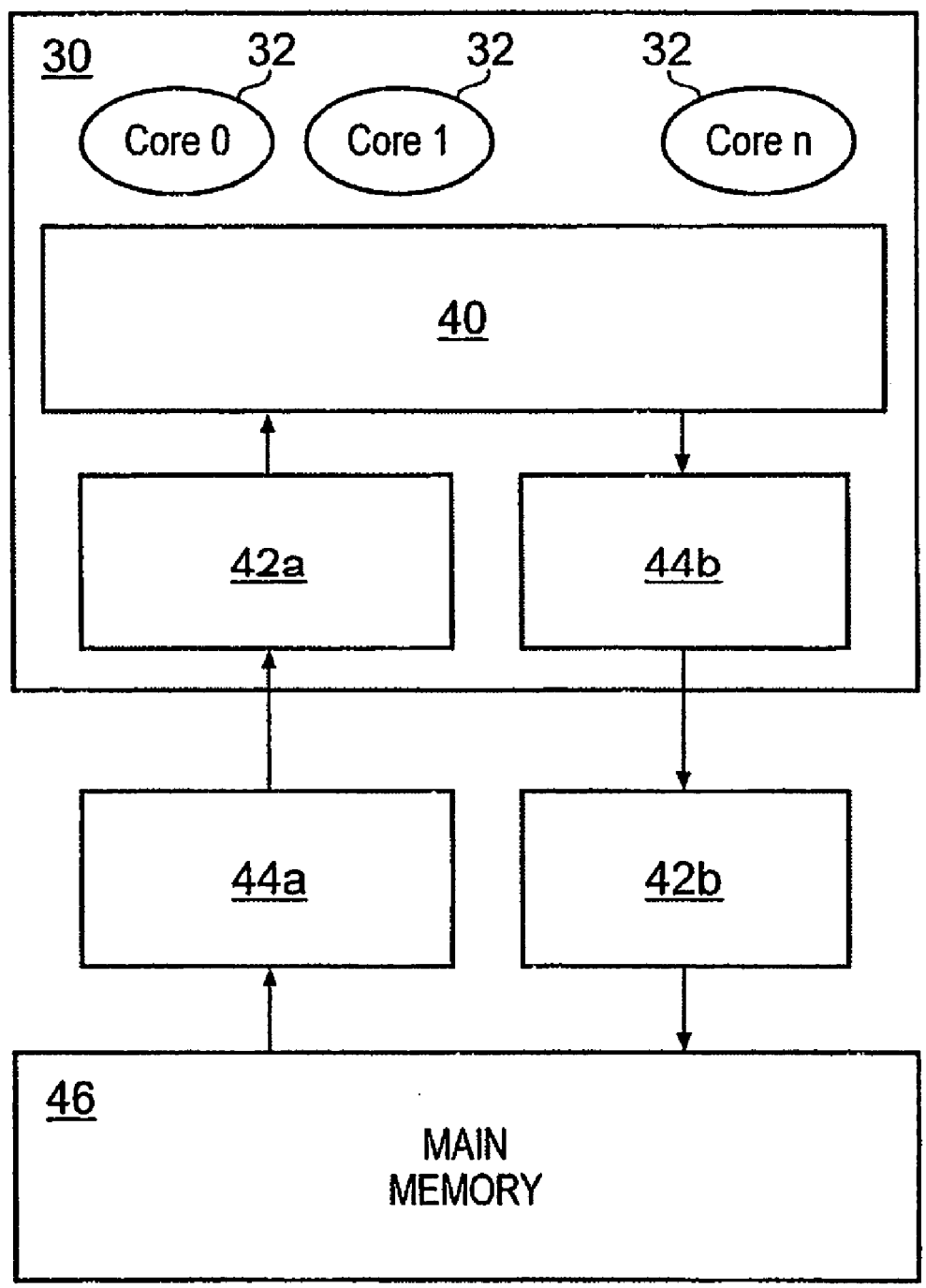
Figure 5:
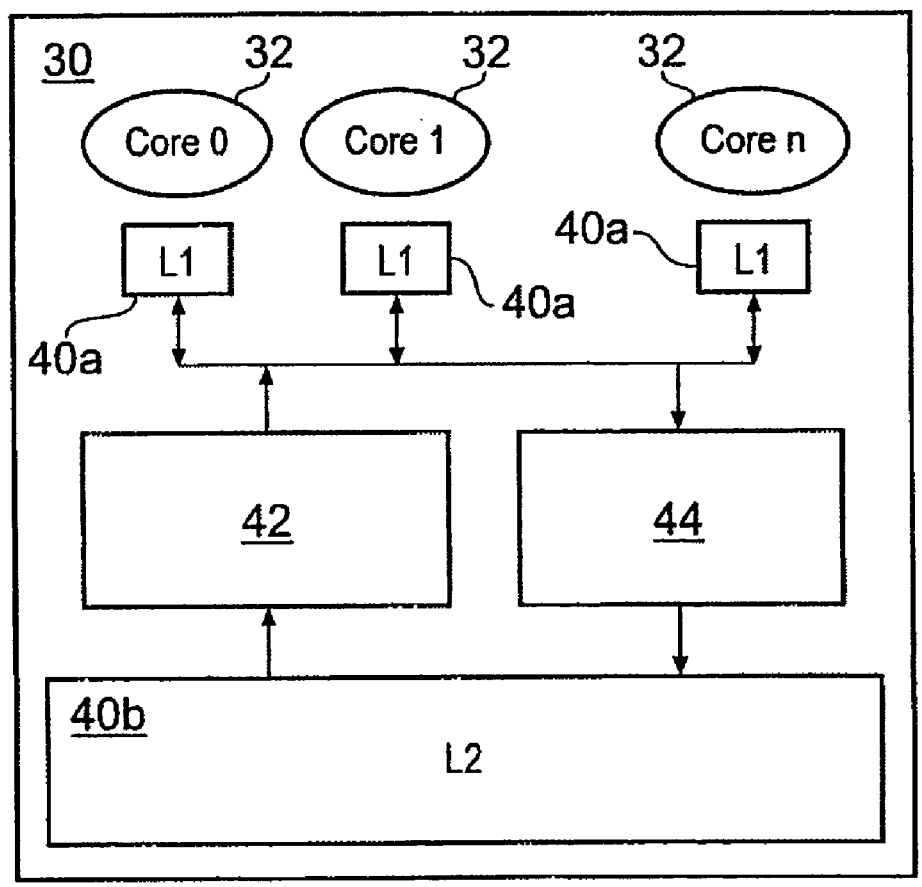

The on-chip caches 40 are linked to the main memory 46 by a number of buses, which are shown in FIG. 3, and also in FIGS. 4 and 5, as arrows. The direction of the arrows in these figures generally indicates the direction of data flow. It will be noted that data flowing from the on-chip caches 40 to the main memory 46 encounters a transform and compression unit 44, which, in this example, is provided on the processor chip 30 itself. Similarly, when data is read from the main memory 46 to the on-chip caches 40, it is retrieved via a decompression and transform unit 42. In general terms, the transform and compression unit 44 is operable to take data which is being read from the on-chip caches 40 and apply a method such as that described in relation to FIG. 1 above, prior to writing it to the main memory 46. Similarly, and again in general terms, the decompression and transform unit 42 is operable to apply a method such as that described above in relation to FIG. 2 to data, which is read from the main memory 46, prior to writing it to the on-chip caches 40.

Another arrangement is shown in FIG. 4. In this example, a processor chip 30 includes a number of processor cores 32 as described above. Again, a number of on-chip caches 40 and a main memory 46 are provided, by way of the first and second levels of a hierarchical memory arrangement. The example shown in FIG. 4 differs from the example shown in FIG. 3 insofar as two decompression and transform units 42a and 42b and two transform and compression units 44a and 44b are provided. The decompression and transform unit 42a and the transform and compression unit 44b are provided on-chip while the transform and compression unit 44a and the decompression and transform unit 42b can be provided off chip. This arrangement allows data to be transformed and compressed in either direction of data flow, as appropriate. For example, it is envisaged that data may be held in the on-chip caches 40 in compressed form and decompressed before storage in the main memory.

FIG. 5 shows a further arrangement. In this example, a processor chip 30 includes a number of processor cores 32 as described above in relation to FIGS. 3 and 4. The hierarchical memory in this example includes two cache levels. Thus, there are provided a plurality of L1 caches 40a, and an L2 cache 40b. These two cache levels are connected by a series of data buses shown in FIG. 5 in the form of arrows. In between the two memory levels are provided a decompression and transform unit 42 and a transform and compression unit 44 of the kind described above. It is noted that in this embodiment, the invention is implemented on a processor chip 30, there being no express need for components external to the processor chip 30.

It is envisaged that this invention can be implemented using combinations of arrangements of the kind shown in FIGS. 3 to 5. Thus, for example, transform and compress units can be employed between more than two memory levels. In particular, it is envisaged that an arrangement such as that shown in relation to FIG. 5 could also include an off-chip main memory such as that described in relation to FIGS. 3 and 4 and a transform and compression unit and a decompression and transform unit, which can be provided either on or off-chip.

Accordingly, an embodiment of the invention compresses and decompresses data between two levels of memory, which may be adjacent in a memory hierarchy. Data compression between two levels of memory can be enhanced by applying a transform which has a tendency to group together repetitive or null data values prior to application of a data compression scheme. In computer memories, null or repetitive data values tend to occur towards one end (the most significant bits) of a data word. The transform described herein tends to produce a plurality of transformed data words in which such null or repetitive data values are brought together in one or more data words. Data words of this form are more efficiently compressible using compression schemes such as the Frequent Pattern Compression (FPC) scheme.

There will now be described a number of example implementations of a transform and compression unit of the kind shown in FIGS. 3 to 5. These example arrangements are described below in relation to FIGS. 6 to 10.

Figure 6:
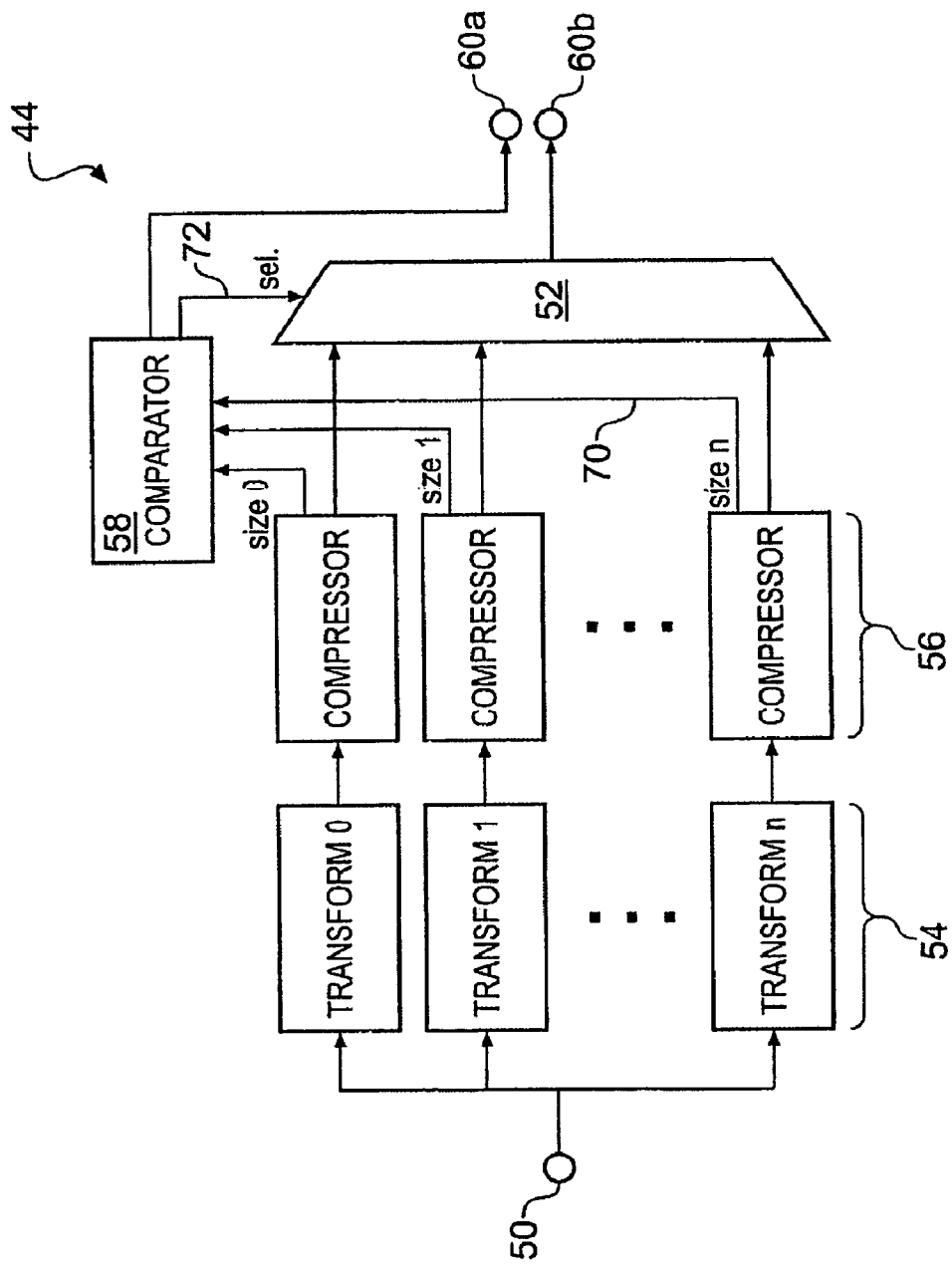
FIGS. 6 to 10 show examples of transform and compression units in accordance with embodiments of the invention.

A first arrangement for a transform and compression unit 44 is shown in FIG. 6. In accordance with embodiments of this invention, it is envisaged that multiple transform and compression types can be applied to the same set of data in parallel, thereby to determine which transform and compression type is most efficient for producing compressed data. Thus, in FIG. 6 the transform and compression unit 44 comprises an input 50 which supplies data in parallel to a plurality of transform units labeled generally at 54. Transform unit 0 provides an identity transform, or in other words, it does not transform the data at all. This transform unit is provided because for certain types of data, the transforms described herein can actually inhibit compressibility, for example, if the data are already in a highly compressible form. The other transform units (transform 1 to transform n) apply transforms using different parameters (eg B, W and S, as described above). Accordingly, the different transform units can apply the transform $G_{jk} \rightarrow G_{kj}$ to different sized blocks of data, and can also assume different sized data words and/or data groups within the data words. In order to make the output sizes comparable when applying transforms that work on different block sizes, the transform blocks that work on smaller block sizes can contain multiple transform blocks so that the size of the output from each of the transform blocks 54 are the same.

Once the transforms have been applied to the data in parallel, the transformed data words are asserted to a plurality of respective compressors labeled generally at 56. These compressors 56 apply a data compression scheme. For example, the compressors 56 can apply the FPC scheme. The compressors 56 can be configured to apply the compression to each respective transformed data word which is outputted from the respective transform units 54. Having compressed the data, the compressed data is then asserted to a multiplexer 52 from each of the respective compressors 56.

The compressors 56 also output a size signal to a comparator 58. The size signal is indicative of the size of the compressed data and is therefore indicative of how successful the transform and compression scheme has been in each case for compressing the data. The comparator 58 inspects each size signal and then passes a select signal 72 to the multiplexer 52, which is indicative of which transform unit 54 and compressor 56 pair has produced the most compressed form of the data. The multiplexer 52 is then able to pass on the compressed data from the chosen transform unit 54 and compressor 56 pair to an output 60b of the transform and compression unit 44. Note that the comparator 58 can also pass a signal such as the tag signal described above to an output 60a for indicating whether a transform and compression scheme has been applied and for also indicating which type of transform and compression scheme has been applied.

The embodiment shown in FIG. 6 thus allows the transform and compression unit 44 to chose between a plurality of different transform and compression schemes having different parameters (e.g. W, S and B), thereby to optimize compression.

In other examples, the degree to which the various transforms and compressions are applied in parallel can be varied in accordance with system requirements. In general, a higher degree of parallelism requires more components to implement, but is able to perform the transform and compression methods described herein more quickly.

Figure 7:
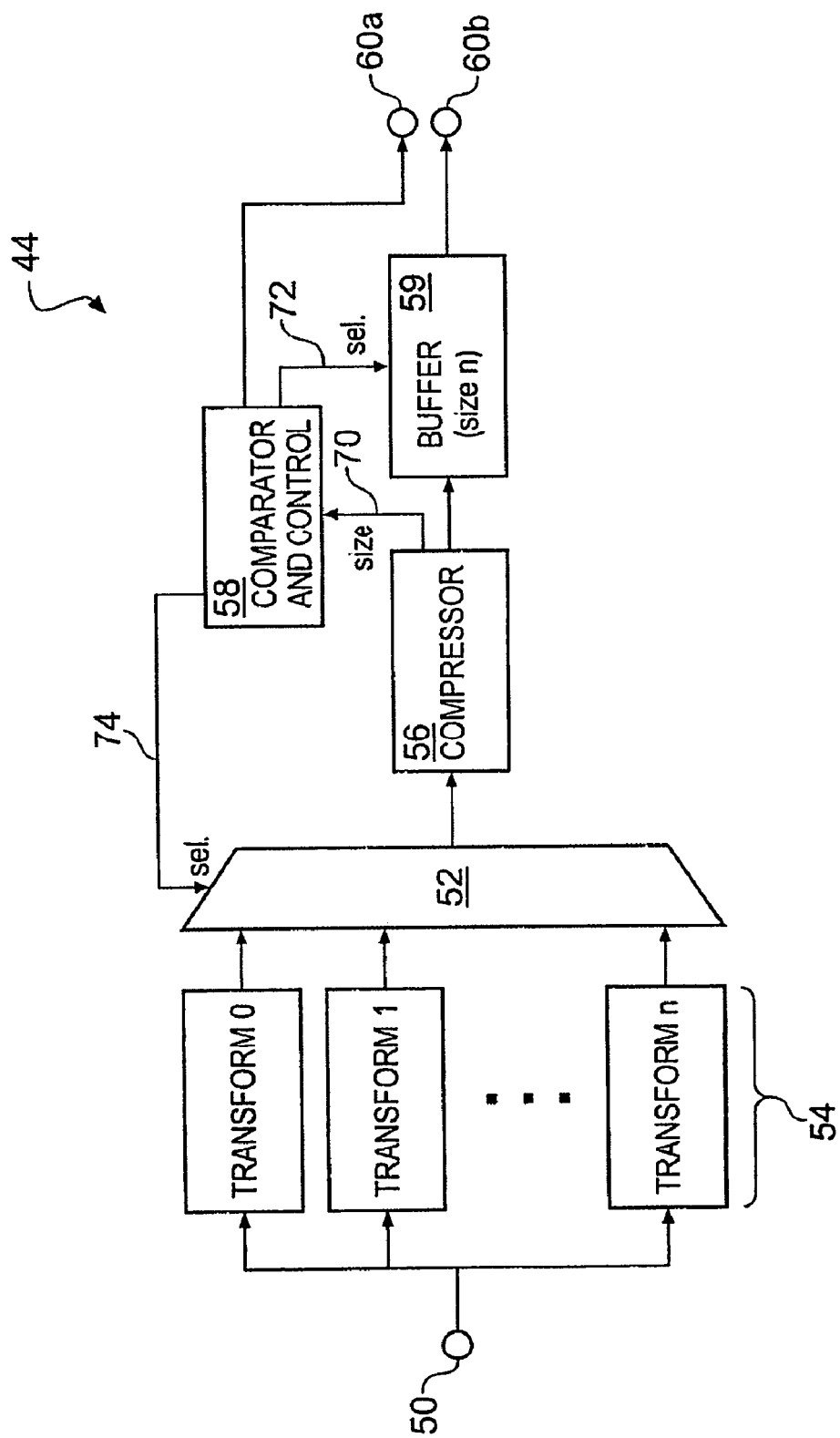

Another example of a transform and compression unit 44 is shown in FIG. 7. In this example, a plurality of transform units labeled generally at 54 perform a variety of different transform types as described above in relation to FIG. 6. Also as described above, the transform data words are then asserted to a multiplexer 52. The transform and compression unit 44 in this example only comprises a single compressor 56. Thus, while the various different transforms are applied in parallel, the compressor 56 is used to compress data which has been transformed by each of the different transform units 54. This is done in successive cycles, and the transformed and compressed data is stored in a buffer 59. A comparator and control unit 58 receives a size signal 70 from the compressor 56 which is indicative of the size of the transformed and compressed data produced by the combination of each respective transform unit 54 and the compressor 56. The comparator and control unit 58 can apply a control signal 74 to the multiplexer 52 for selecting a respective one of the transform units 54 on each cycle for output by the multiplexer 52 to the compressor 56.

When transformed and compressed data according to each combination of transform unit 54 and the compressor 56 has been produced and stored in the buffer 59, the comparator and control unit 58 is operable to output a select signal 72 to the buffer 59, which is indicative of which transform unit 54 and compressor 56 combination has produced the most efficient compression. The buffer 59 responds to the select signal 72 to output the transformed and compressed data according to the transform unit 54 and compressor 56 combination to an output 60b of the transform and compression unit 44. The comparator and control unit 58 also outputs a signal such as the tag signal described above to the output 60a of the transform and compression unit 44.

Figure 8:
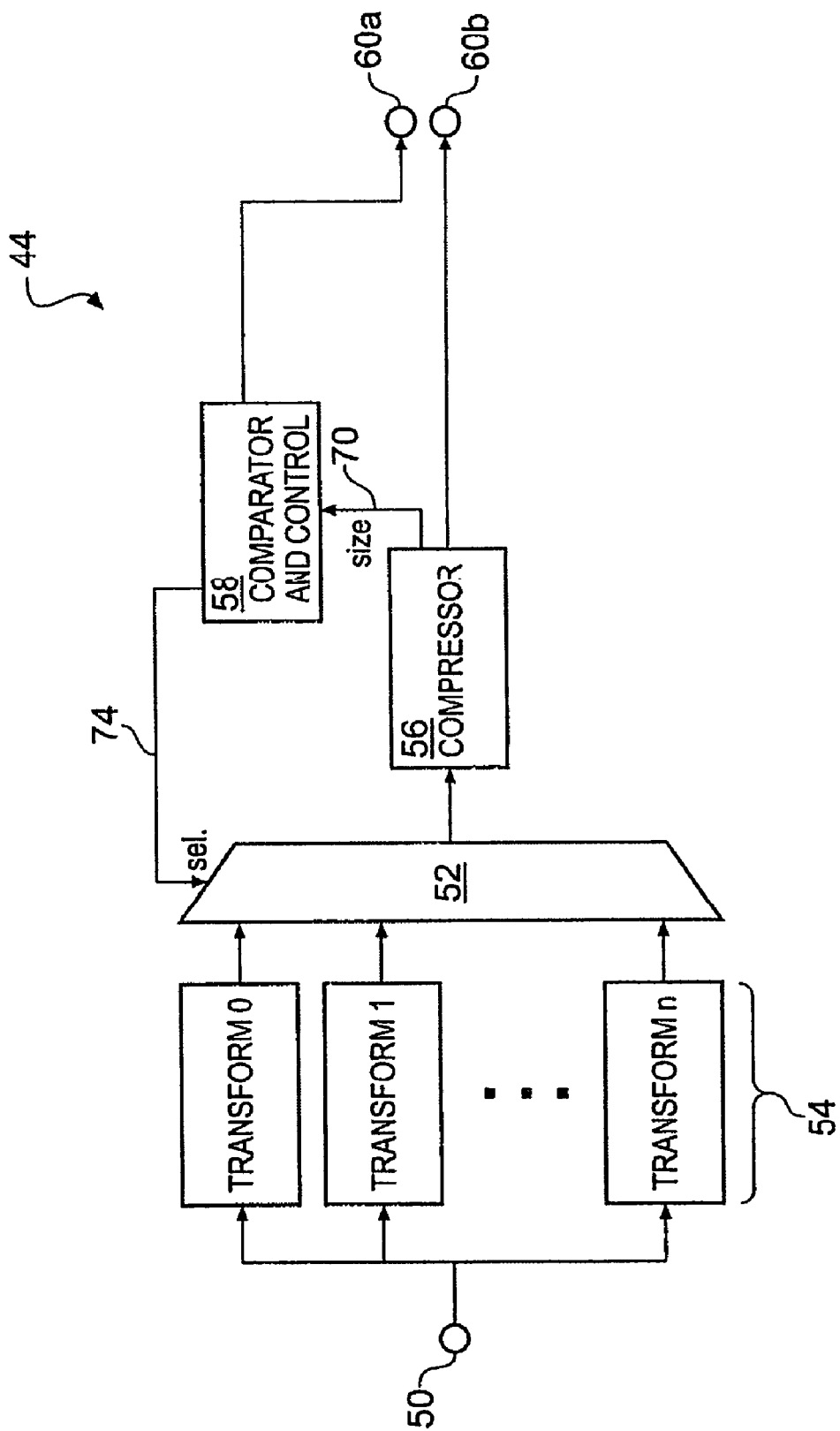

Another example is shown in FIG. 8. This example is similar to the example shown in FIG. 7, but the buffer unit is omitted. Thus, as described above, the data to be transformed and compressed are inputted by the input 50 to each of a plurality of transform units 54. The transform data words are then asserted to a multiplexer 52. A comparator and control unit 58 applies a select signal 74 to select each successive transform unit 54, whereby the transform data words from that transform unit 54 are passed onto the compressor 56 for compression. The compressor 56 produces compressed data and then sends a size signal 70 to the comparator and control unit 58.

This is performed in turn for each transform 54 and compressor 56, until all of the different combinations have been performed. The comparator and control unit 58 then determines which transform unit 54 and compressor 56 has been most successful in producing compressed data and applies a select signal 74 to the multiplexer 52 to select the appropriate transform unit 54, whereby the most successful transform unit 54 and compressor 56 pair then re-perform their respective tasks thereby to produce optimally transformed and compressed data, which is then passed to the output 60b of the transform and compression unit 44. As described above, the comparator and control unit 58 can also apply a signal such as a tag of the kind described above to the output 60a of the transform and compression unit 44.

Figure 9:
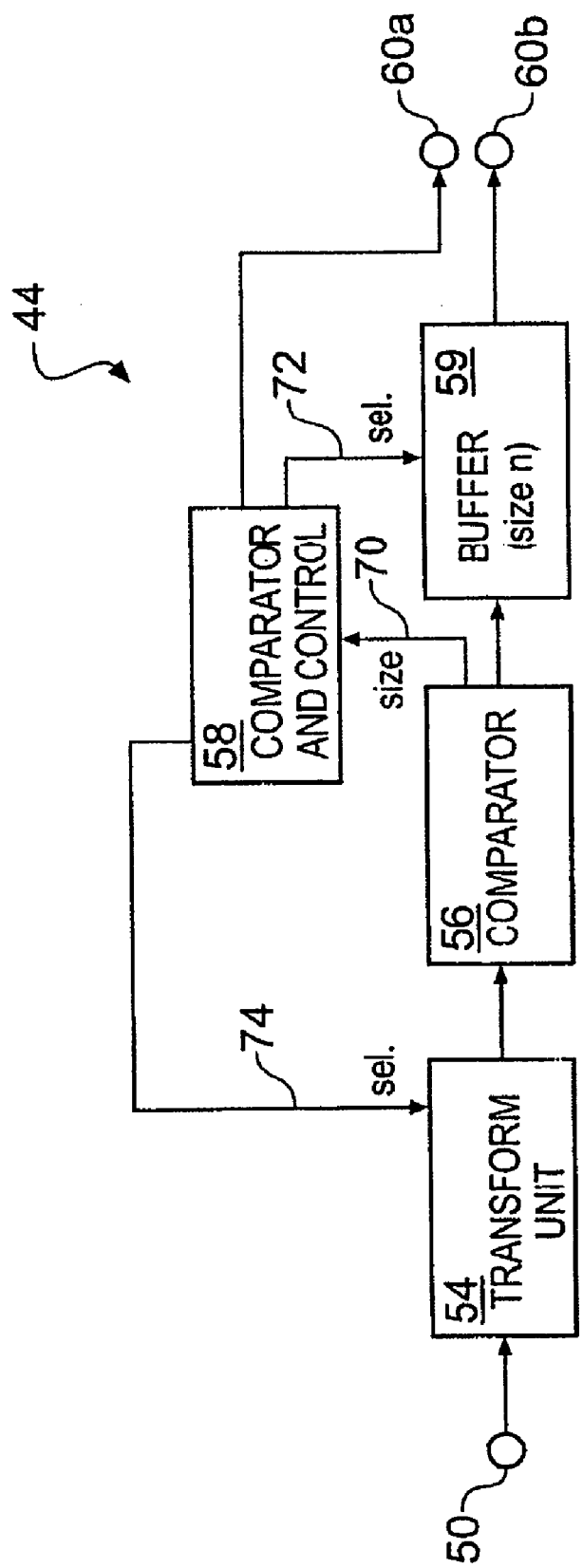

A further example of a transform and compression unit 44 is shown in FIG. 9. In this example, only a single transform unit 54 is provided. Accordingly, in this example, both the transform and the compression schemes are applied in series as opposed to parallel. Thus, the transform unit 54 and the compressor 56 apply one or more transform and compression schemes having different parameters of the kind described above (e.g. B, W and S) on successive cycles under the control of the comparator and control unit 58 via a select signal 74.

The transformed and compressed data produced by each transform and compression scheme are stored in a buffer unit 59. Also, the compressor 56 outputs a size signal 70 for each transform and compression scheme to the comparator and control unit 58. When all of the different transform and compression schemes have been applied, the comparator and control unit 58 outputs a select signal 72 to the buffer unit 59. The buffer unit 59 is responsive to the select signal 72 to output the most compressed version of the data by the output 60b of the transform and compression unit 44. Again, and as described above, the comparator and control unit 58 can be operable to output a signal such as a tag as described above by the output 60a of the transform and compression unit 44.

Figure 10:
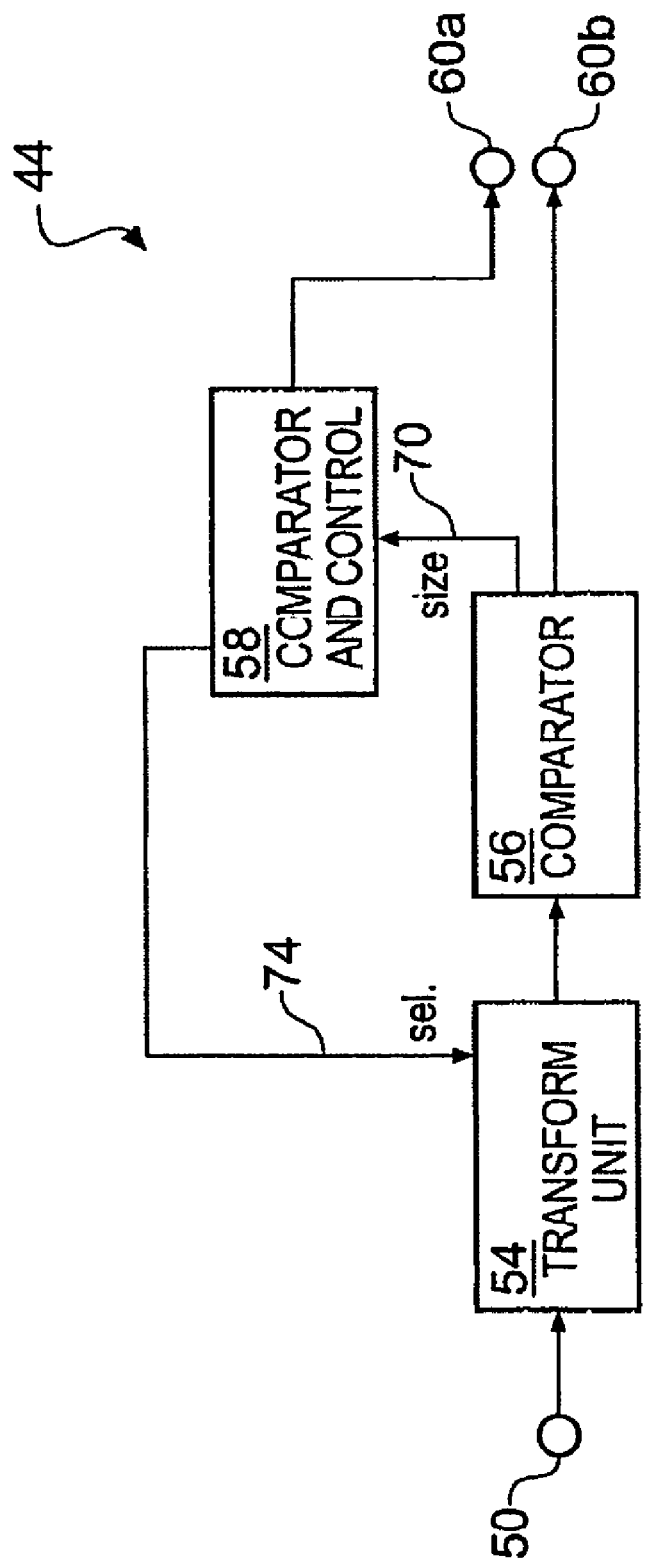

Another example of a transform and compression unit 44 is shown in FIG. 10. This example is similar to the example shown in FIG. 9 in that the different transform and compression schemes are applied in series, there being only a single transform unit 54 and compressor 56. However, and in common with the example shown in FIG. 8, the example shown in FIG. 10 does not include a buffer unit. Instead, and as described above, each transform and compression scheme is applied in series and a size signal 70 is supplied by the compressor 56 to the comparator and control unit 58 indicating the size of the compressed data produced by each respective transform and compression scheme.

The comparator and control unit 58 then determines which transform and compression scheme has produced the most compressed data and supplies a select signal 74 to the transform unit 54 whereby the data inputted via the input 50 are transformed and compressed using the most successful transform and compression scheme and are subsequently outputted by the output 60b of the transform and compression unit 44. Again, as described above, the comparator and control unit 58 can be operable to output a signal such as the tag described above by the output 60a of the transform and compression unit 44.

Thus, various degrees of parallelism can be employed. It is noted, however, that in some embodiments it is envisaged that the parameters of the transform and compression types can be pre-selected in accordance with system parameters as opposed to in accordance with an explicitly tested set of different transform parameters, whereby it is not necessary to provide any degree of parallelism at all. While enforcing a predetermined set of parameters upon the data for transform and compression (for example, parameters such as word size and block size according to the characteristics of the data cache) can allow the transform and compression to be tailored to a given computer system, this can reduce the benefits achievable by transform and compression schemes described herein, since the chosen parameters may not be the optimal parameters for a given data set. On the other hand, predetermining the parameters reduces the complexity of the apparatus which is required to implement an embodiment of the invention.

As described above, the transform and compression methodology described herein can be applied in reverse, for decompressing and untransforming compressed data. Examples of decompression and transform units 42 are now described in relation to FIGS. 11 and 12.

Figure 11:
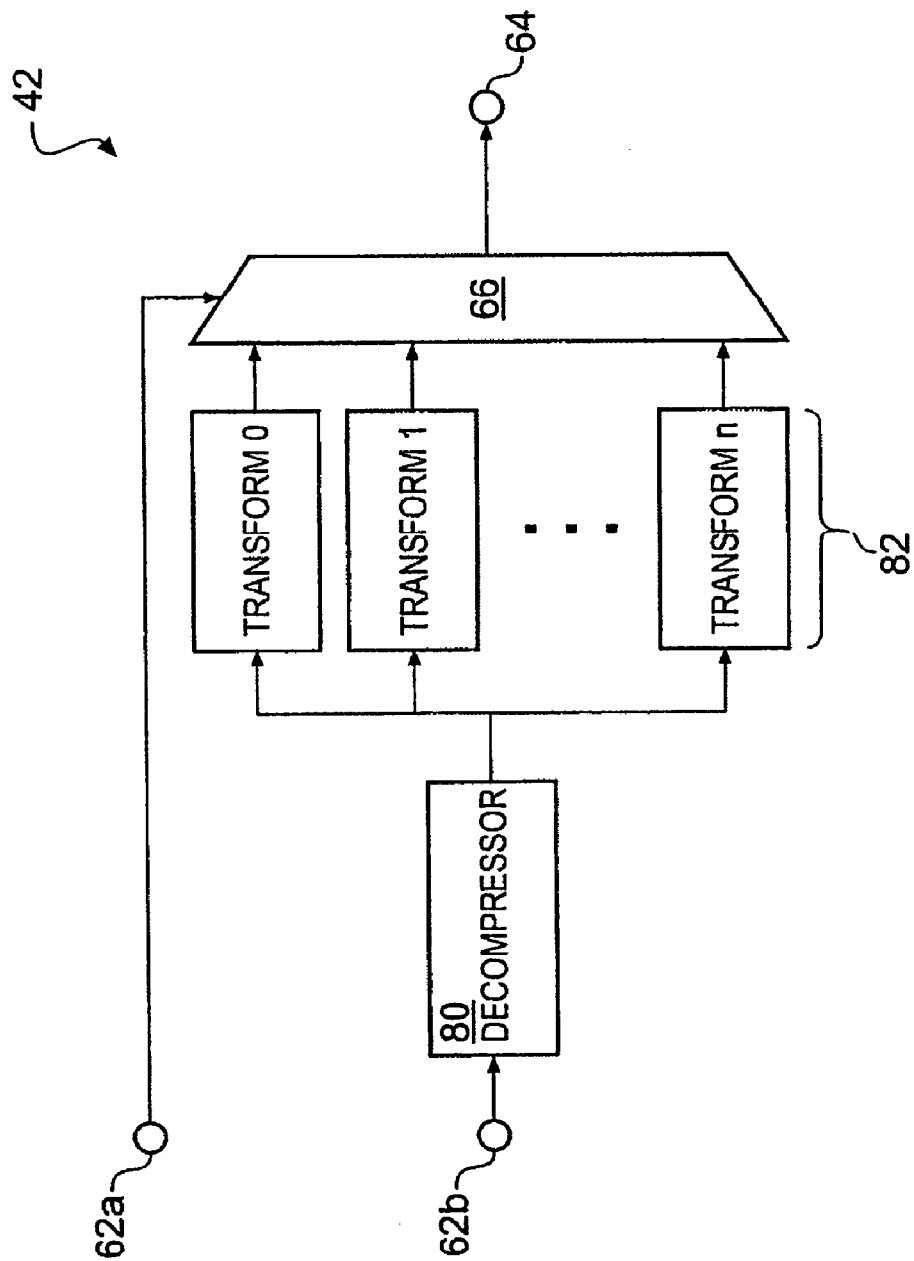
FIGS. 11 and 12 show examples of decompression and transform units in accordance with embodiments of the invention.

The decompression and transform unit 42 shown in FIG. 11 has two inputs 62a and 62b. The input 62b receives compressed data and passes it to a decompressor unit 80. The decompressor 80 is able to decompress data which has been transformed and compressed using different parameters as described above. Having done so, the decompressor 80 passes the appropriate decompressed data to each of a plurality of transform units 82.

The transform units 82 are each able to perform a transform of the kind described above in relation to step 24 of FIG. 2 for applying a reverse transform to the decompressed data to produce decompressed and untransformed data. The results produced by each transform unit 82 are asserted to a multiplexer 66. The other input 62a of the decompression and transform unit 42 receives a signal of the kind described above in relation to the output 60a of the various different types of transform and compression units shown in FIGS. 6 to 10. Thus, the input 62a receives a signal which is indicative of the type of transform and compression scheme which has been applied in compressing the data which is received by the input 62b. This signal is asserted to the multiplexer 66, whereby the multiplexer 66 can select the correct transform unit 82 for outputting decompressed and transformed data to the output 64 of the decompression and transform unit 42.

Figure 12:
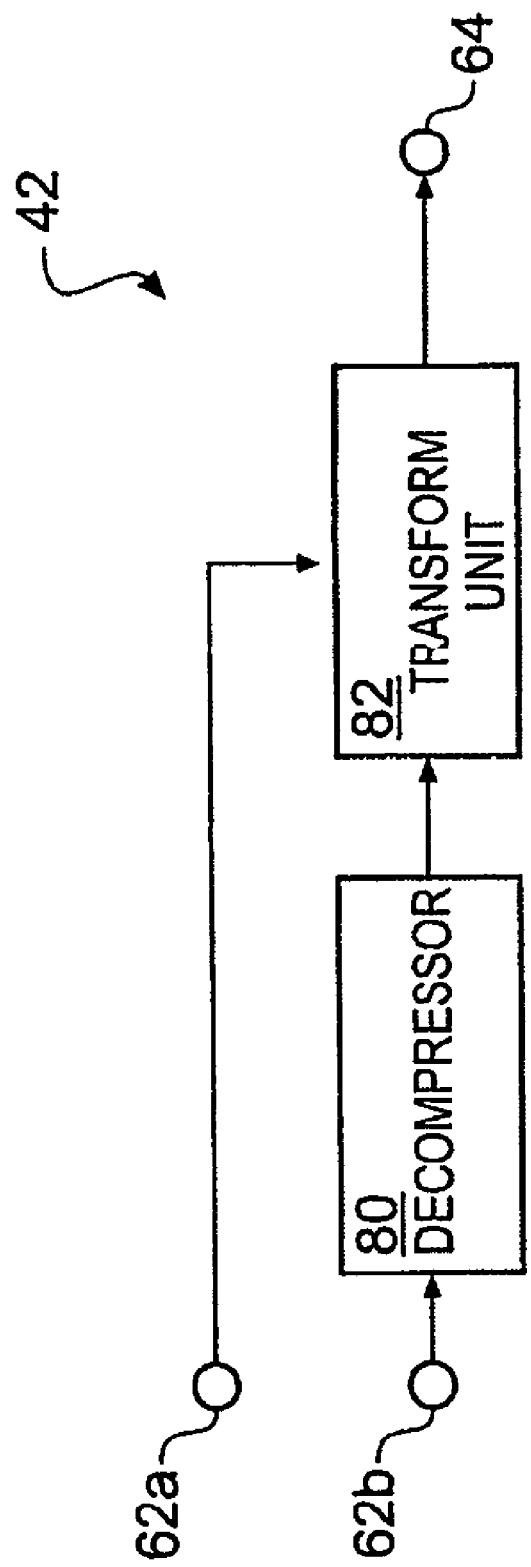

As described above in relation to the transform and compression units shown in FIGS. 6 to 10, various degrees of parallelism can be employed in a decompression and transform unit 42 in accordance with embodiments of this invention. In FIG. 12, the multiplexer shown in FIG. 11 is omitted and the transform unit 82 is able to perform each of the multiple different types of transform. In the example shown in FIG. 12 the signal 62a indicative of which kind of transform and compression scheme has been applied in compressing compressed data which is received by the input 62b is applied to the transform unit 82. The transform unit then applies the appropriate transform to the decompressed data received from the decompressor 80 and outputs decompressed and untransformed data to the output 64 of the decompression and transform unit 42.

Embodiments of this invention find particular application to the compression of floating point numbers, which are held in memory according to the IEEE 754 standard. According this standard, a floating point number is represented as shown in equation 1 below $$f.p.n. = s \times f \times 2^c \quad (1)$$

Thus, when storing the number in the memory of a computer system according to this standard, three fields are provided, namely a sign bit "s", an exponent "c" and a mantissa "f". The signed bit s is always one bit while the number of bits which are used to encode c and f can be varied according to the degree of precision which is desired. This is illustrated in Table 7 below which indicates a number of bits for each of the three fields s, c and f for encoding floating point numbers using 32, 64 and 128 bit position.

TABLE 7

| Degree of precision | s | c | f |
|---|---|---|---|
| 32 bit | 1 | 8 | 23 |
| 64 bit | 1 | 11 | 52 |
| 128 bit | 1 | 15 | 111 |

When floating point numbers are stored consecutively in memory, they are often of the same magnitude. Accordingly, in such cases, they have the same values of s and c. For this reason, the transform and compression schemes described herein find particular application in compressing floating point numbers which are stored using the IEEE 754 standard.

As is clear from Table 7, when different degrees of precision are used, the number of bits required to represent c must be chosen appropriately. However, as described above, the parameters of the transform and compression schemes described herein can be varied as required. Accordingly, in one example, each floating point number can be separated off into a respective data word as described above and an appropriate group size within those data words can be chosen according to the degree of precision which is required for the floating point number, and in particular in accordance with the number of bits which have been used to encode the value of c and s, which equals number of bits for c+1 since s always has the length 1.

The values of s, c and f can generally be stored as consecutive data bits in memory. Thus the group size can be chosen such that the values of s and c occupy the first data group in each data word. Subsequent data groups in the data word can hold the value of f. As indicated above, since floating point numbers held in memory often have the same magnitude, this will lead to a plurality of data words each having a first data group of the same value. When a transform of a type described above is applied to a plurality of data words of this kind, it will result in a number of transformed data words which include multiple repeated values corresponding to the like values of s and c. Data words comprising repeated values of this kind are readily compressible using a data compression scheme such as the FPC scheme.

Thus, embodiments of this invention can allow floating point numbers to be transformed and compressed using the methodology described herein, which results in a high degree of compressibility and which also can be implemented in a flexible manner according to the level of precision which is required for storing the floating point number.

The transform and compression units and the decompression and transform units described above can be used for compressing and decompressing data in a hierarchical memory arrangement in a computer system. The transform and compression units and the decompression and transform units described above can also used for compressing data prior to data transmission and then for decompressing data after it has been transferred.

Thus there has been described a method and apparatus for compressing uncompressed data by using applying a transform prior to the application of a data compression scheme. At decompression time, a transform can be applied after a data decompression scheme has been applied to compressed data.

An embodiment of the invention can provide a method of compressing uncompressed data, the uncompressed data comprising a plurality of data words, the data words comprising a plurality of data groups $G_{jk}$, wherein k denotes the $k^{th}$ data group in the $j^{th}$ data word, the method comprising: applying a transform to produce a transformed plurality of data words, the transform being of the form $G_{jk} \rightarrow G_{kj}$; and applying a data compression scheme to each data word in the plurality of transformed data words.

In one example embodiment, the method of compressing can include compressing uncompressed data from a first level memory of a computer system and storing the compressed data in a second level memory of the computer system.

It should be noted that references to a first level memory in this document does not mean a memory at a level one, rather that it relates to an nth level (n being an integer) of a plurality of memory levels. Similarly, references to a second level memory in this document does not mean a memory at a level two, or a memory at a level necessarily adjacent to adjacent the first level, rather that it relates to an n+mth level (n and m being integers) of a plurality of memory levels.

In one example, the first level memory could comprise a cache, the plurality of data words in the uncompressed data could correspond to a cache line of data in the cache, the second level memory could comprise a main memory and the method could comprise writing the transformed and compressed data to the main memory. In another example, the first level memory could comprise an L2 cache, the second level memory could comprise an L3 cache, the plurality of data words in the uncompressed data could correspond to a cache line of data in the L2 cache and the method could comprise writing the transformed and compressed data to the L3 cache.

An example embodiment of the method of compressing can include compressing uncompressed data and transferring the compressed data words from a first location to a second location.

In one example embodiment of the method of compressing, the data words in the uncompressed data can be of length W, and the method can comprise applying the transform and the data compression scheme to uncompressed data comprising data words having different values of W. In one example embodiment of the method of compressing, the data groups in the uncompressed data can be of length S, and the method can comprise applying the transform and data compression scheme to uncompressed data comprising data groups having different values of S. In one example embodiment of the method of compressing, the uncompressed data can comprise data blocks of length B, and the method can comprise applying the transform and data compression scheme to uncompressed data comprising data blocks having different values of B.

An example of the method of compressing can include applying the transform and/or data compression scheme to uncompressed data comprising different sized data blocks, data words or data groups, wherein the transform and/or data compression scheme are applied to the different sized data words, data groups and/or data blocks in parallel.

An example of the method of compressing can include applying the transform and/or data compression scheme to uncompressed data comprising different sized blocks, data words or data groups, and selecting a best transform and/or compression scheme to use according to the degree of compression which is achieved.

An example of the method of compressing can include supplementing the compressed data with a tag representative of the transform. The tag can, for example, be indicative of at least one of: a length W of the data words; a length S of the data groups; and a length B of data blocks to which the transform and data compression scheme have been applied.

A method can further include: decompressing compressed data comprising a plurality of compressed data by: applying a data decompression scheme to the compressed data to produce a plurality of decompressed data words, wherein the decompressed data words comprise a plurality of data groups $G_{kj}$, wherein j denotes the $j^{th}$ data group in the $k^{th}$ decompressed data word; and applying a transform to produce a transformed plurality of data words, the transform being of the form $G_{kj} \rightarrow G_{jk}$.

An embodiment of the invention can provide a method of decompressing compressed data comprising a plurality of compressed data words, the method comprising: applying a data decompression scheme to the compressed data to produce a plurality of decompressed data words, wherein the decompressed data words comprise a plurality of data groups $G_{kj}$, wherein j denotes the $j^{th}$ data group in the $k^{th}$ decompressed data word; and applying a transform to produce a transformed plurality of data words, the transform being of the form $G_{kj} \rightarrow G_{jk}$.

In one example embodiment the method of decompressing can include decompressing compressed data from a second level memory of a computer system and storing the decompressed data in a first level memory of the computer system.

For example, the first level memory could comprise a cache, the plurality of data words in the uncompressed data could correspond to a cache line of data in the cache, the second level memory could comprise a main memory and the method could comprise reading the compressed data from the main memory, applying the data decompression scheme and the transform, and writing the transformed plurality of data words to the cache. In another example, the first level memory could comprise an L2 cache, the second level memory could comprise an L3 cache, the plurality of transformed data words could comprise a cache line of data for the L2 cache, and the method could comprise reading the compressed data from the L3 cache, applying the data decompression scheme and the transform, and writing the transformed plurality of data words to the L2 cache.

An example embodiment of the method of decompressing can include transferring the compressed data words from a first location to a second location and then decompressing the compressed data.

In one example embodiment of the method of decompressing, the transformed plurality of data words can be of length W, and the method can comprise applying the data decompression scheme and the transform to produce data words having different values of W. In one example embodiment of the method of decompressing, the data groups in the transformed plurality of data words can be of length S, and the method can comprise applying the data decompression scheme and the transform to produce groups having different values of S. In one example embodiment of the method of decompressing, the transformed plurality of data words can be comprised in a data block of length B, and the method can comprise applying the data decompression scheme and the transform to produce data blocks having different values of B.

An example of the method of decompressing can comprise applying the data decompression scheme and/or transform to produce different sized data blocks, data words or data groups, wherein the data decompression scheme and/or transform are applied to produce the different sized data blocks, data words or data groups in parallel.

An example of the method of decompressing can comprise determining the transform applied to the compressed data from a tag of the compressed data. The tag can, for example, be indicative of at least one of: a size W of the plurality of transformed data words; a size S of the data groups in the plurality of transformed data words; and a size B of cache blocks in which the plurality of transformed data words are comprised.

An embodiment of the invention can also provide an apparatus comprising a data transform and compression unit for compressing uncompressed data, the uncompressed data comprising a plurality of data words, the data words comprising a plurality of data groups $G_{jk}$, wherein k denotes the $k^{th}$ data group in the $j^{th}$ data word, the data transform and compression unit being operable to: apply a transform to produce a transformed plurality of data words, the transform being of the form $G_{jk} \rightarrow G_{kj}$; and apply a data compression scheme to each data word in the plurality of transformed data words. The apparatus can, for example be a computer system comprising: a first level memory; a second level memory; and the data transform and compression unit, wherein the data transform and compression unit is operable to compress uncompressed data from the first level memory for storage in the second level memory.

An embodiment of the invention can also provide a apparatus comprising a data decompression and transform unit for decompressing compressed data comprising a plurality of compressed data words from a second level memory of a computer system for storage in a first level memory of the computer system, the data decompression and transform unit being operable to: apply a data decompression scheme to the compressed data to produce a plurality of decompressed data words, wherein the decompressed data words comprise a plurality of data groups $G_{kj}$, wherein j denotes the $j^{th}$ data group in the $k^{th}$ decompressed data word; and apply a transform to produce a transformed plurality of data words, the transform being of the form $G_{kj} \rightarrow G_{jk}$. The apparatus can, for example be a computer system comprising: a first level memory; a second level memory; and the data decompression and transform unit.

As described above, the invention could be implemented in hardware in a computer system. Alternatively, the invention may be implemented in software, in the form of a computer program product. In some embodiments, the computer program product can be provided on a carrier medium.

An embodiment of the invention can provide a computer program product on a carrier medium, the program product including program instructions executable in a computer system to implement a method of compressing uncompressed data from a first level memory of a computer system for storage in a second level memory of the computer system. The uncompressed data includes a plurality of data words. The data words include a plurality of data groups $G_{jk}$, where k denotes the $k^{th}$ data group in the $j^{th}$ data word. The method includes applying a transform to produce a transformed plurality of data words. The transform is of the form $G_{jk} \rightarrow G_{kj}$. The method also includes applying a data compression scheme to each data word in the plurality of transformed data words.

An embodiment of the invention can provide a computer program product on a carrier medium, the program product including program instructions executable in a computer system to implement a method of decompressing compressed data comprising a plurality of compressed data words from a second level memory of a computer system for storage in a first level memory of the computer system. The method includes applying a data decompression scheme to the compressed data to produce a plurality of decompressed data words. The decompressed data words include a plurality of data groups $G_{kj}$, where j denotes the $j^{th}$ data group in the $k^{th}$ decompressed data word. The method also includes applying a transform to produce a transformed plurality of data words. The transform is of the form $G_{kj} \rightarrow G_{jk}$.

A computer program product for implementing the invention can be in the form of a computer program, for example on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of compressing uncompressed data, the uncompressed data comprising a plurality of data words, the data words comprising a plurality of data groups $G_{jk}$, wherein k denotes the $k^{th}$ data group in the $j^{th}$ data word, the method comprising:
    applying a transform to produce a transformed plurality of data words, the transform being of the form $G_{jk} \rightarrow G_{kj}$; and
    applying a data compression scheme to each data word in the plurality of transformed data words.

2. The method of claim 1, comprising compressing uncompressed data from a first level memory of a computer system and storing the compressed data in a second level memory of the computer system.

3. The method of claim 2, wherein the first level memory comprises a cache and wherein the plurality of data words in the uncompressed data corresponds to a cache line of data in the cache.

4. The method of claim 3, wherein the second level memory comprises a main memory and wherein the method further comprises writing the transformed and compressed data to the main memory.

5. The method of claim 4, wherein the first level memory comprises an L2 cache and the second level memory comprises an L3 cache, wherein the plurality of data word in the uncompressed data corresponds to a cache line of data in the L2 cache and wherein the method further comprises writing the transformed and compressed data to the L3 cache.

6. The method of claim 1, comprising compressing uncompressed data and transferring the compressed data words from a first location to a second location.

7. The method of claim 1, wherein the data words in the uncompressed data are of length W, and wherein the method comprises applying the transform and the data compression scheme to uncompressed data comprising data words having different values of W.

8. The method of claim 1, wherein the data groups in the uncompressed data are of length S, and wherein the method comprises applying the transform and data compression scheme to uncompressed data comprising data groups having different values of S.

9. The method of claim 1, wherein the uncompressed data comprise data blocks of length B, and wherein the method comprises applying the transform and data compression scheme to uncompressed data comprising data blocks having different values of B.

10. The method of claim 1, comprising applying the transform and/or data compression scheme to uncompressed data comprising different sized data blocks, data words or data groups, wherein the transform and/or data compression scheme are applied to the different sized data words, data groups and/or data blocks in parallel.

11. The method of claim 1, comprising applying the transform and/or data compression scheme to uncompressed data comprising different sized blocks, data words or data groups, and selecting a best transform and/or compression scheme to use according to the degree of compression which is achieved.

12. The method of claim 1, further comprising supplementing the compressed data with a tag representative of the transform.

13. The method of claim 12, wherein the tag is indicative of at least one of:
    a length W of the data words;
    a length S of the data groups; and
    a length B of data blocks
to which the transform and data compression scheme have been applied.

14. The method of claim 1, further comprising:
    decompressing compressed data comprising a plurality of compressed data by:
        applying a data decompression scheme to the compressed data to produce a plurality of decompressed data words, wherein the decompressed data words comprise a plurality of data groups $G_{kj}$, wherein j denotes the $j^{th}$ data group in the $k^{th}$ decompressed data word; and
        applying a transform to produce a transformed plurality of data words, the transform being of the form $G_{kj} \rightarrow G_{jk}$.

15. A method of decompressing compressed data comprising a plurality of compressed data words, the method comprising:
    applying a data decompression scheme to the compressed data to produce a plurality of decompressed data words, wherein the decompressed data words comprise a plurality of data groups $G_{kj}$, wherein j denotes the $j^{th}$ data group in the $k^{th}$ decompressed data word; and applying a transform to produce a transformed plurality of data words, the transform being of the form $G_{kj} \rightarrow G_{jk}$.

16. The method of claim 15, comprising decompressing compressed data from a second level memory of a computer system and storing the decompressed data in a first level memory of the computer system.

17. An apparatus, comprising
a processor; and
a data transform and compression unit for compressing uncompressed data, the uncompressed data comprising a plurality of data words, the data words comprising a plurality of data groups $G_{jk}$, wherein k denotes the $k^{th}$ data group in the $j^{th}$ data word, the data transform and compression unit being operable to:
apply a transform to produce a transformed plurality of data words, the transform being of the form $G_{jk} \rightarrow G_{kj}$; and
apply a data compression scheme to each data word in the plurality of transformed data words.

18. The apparatus of claim 17, the apparatus being a computer system comprising:
a first level memory;
a second level memory; and
the data transform and compression unit, wherein the data transform and compression unit is operable to compress uncompressed data from the first level memory for storage in the second level memory.

19. An apparatus comprising:
a processor; and
a data decompression and transform unit for decompressing compressed data comprising a plurality of compressed data words from a second level memory of a computer system for storage in a first level memory of the computer system, the data decompression and transform unit being operable to:
apply a data decompression scheme to the compressed data to produce a plurality of decompressed data words, wherein the decompressed data words comprise a plurality of data groups $G_{kj}$, wherein j denotes the $j^{th}$ data group in the $k^{th}$ decompressed data word; and
apply a transform to produce a transformed plurality of data words, the transform being of the form $G_{kj} \rightarrow G_{jk}$.

20. The apparatus of claim 19, the apparatus being a computer system comprising:
a first level memory;
a second level memory; and
the data decompression and transform unit.

* * * * *